(12) United States Patent  
Kastan

(10) Patent No.: US 8,235,152 B2
(45) Date of Patent: Aug. 7, 2012

(54) AIRCRAFT MOVING DEVICE

(75) Inventor: Linn Kastan, Rancho Santa Fe, CA (US)

(73) Assignee: Redline Aviation, LLC, Rancho Santa Fe, CA (US)

( * ) Notice: Subject to any disclaimer, the term of this patent is extended or adjusted under 35 U.S.C. 154(b) by 47 days.

(21) Appl. No.: 12/489,791

(22) Filed: Jun. 23, 2009

(65) Prior Publication Data

US 2010/0006354 A1 Jan. 14, 2010

Related U.S. Application Data

(60) Provisional application No. 61/074,753, filed on Jun. 23, 2008.

(51) Int. Cl.
*B62D 51/04* (2006.01)
(52) U.S. Cl. ...................... 180/19.2; 180/904
(58) Field of Classification Search ............. 180/19.2, 180/19.1, 904
See application file for complete search history.

(56) References Cited

U.S. PATENT DOCUMENTS

| 2,432,156 A * | 12/1947 | Hill ........................ 105/26.1 |
| 2,920,845 A * | 1/1960 | Palmiter ..................... 180/19.3 |
| 2,949,972 A * | 8/1960 | Wirkkala .................... 180/19.1 |
| 3,025,922 A * | 3/1962 | Savidge ..................... 180/14.7 |
| 3,150,734 A * | 9/1964 | Duggar, Jr. ................... 180/11 |
| 3,930,548 A * | 1/1976 | Wallraff ....................... 180/6.5 |
| 3,937,290 A * | 2/1976 | Benning ..................... 180/14.7 |
| 4,470,564 A * | 9/1984 | Johnson ........................ 244/50 |
| 4,582,154 A * | 4/1986 | Englund ....................... 180/342 |
| 4,687,070 A * | 8/1987 | Ricciardi ..................... 180/14.7 |
| 4,883,280 A * | 11/1989 | Christian ......................... 280/3 |
| 4,915,185 A * | 4/1990 | Olson ........................ 180/19.2 |
| 6,536,709 B1 | 3/2003 | McVaugh |
| 6,604,707 B2 * | 8/2003 | McVaugh ....................... 244/50 |
| 6,942,180 B2 * | 9/2005 | McVaugh ....................... 244/50 |
| 7,145,298 B1 * | 12/2006 | Garner ........................... 318/17 |
| 2006/0278756 A1 | 12/2006 | Marshall |

OTHER PUBLICATIONS

Dragger, "Motorized airplane tugs, Nose Dragger, Nose pushers, Nose wheel push bars/tugs, Plane t . . . ," http://draqger.com, webpage accessed on Jun. 21, 2010.
Northwest Mfg Inc., "PowerTow MFG of Aircraft Towing Equipment," http://www.powertow.com/products.html, webpage accessed on Jun. 21, 2010.

(Continued)

*Primary Examiner* — Lesley D. Morris
*Assistant Examiner* — Michael Stabley
(74) *Attorney, Agent, or Firm* — Knobbe, Martens, Olson & Bear LLP

(57) ABSTRACT

A tow apparatus for moving an aircraft comprising a frame, a drive member, a contact wheel configured to engage with a nosewheel tire of an aircraft, a transmission portion, a shaft engageable with a nosewheel tire of an aircraft, and a torque arm rotatably supported by the frame. The transmission portion can be configured such that the drive wheels transfer and increase a rotational force produced by the drive member to the contact wheel. The shaft can be movable between a first position and a second position relative to the contact wheel so as to bring the contact wheel into contact with the nosewheel of the aircraft. The torque arm can substantially prevent the rotation of the tow apparatus relative to the nosewheel assembly of the aircraft when the torque arm is engaged with the nosewheel assembly of the aircraft. The drive member can have a portable power source.

18 Claims, 12 Drawing Sheets

OTHER PUBLICATIONS

Northwest Mfg Inc., "Supertow III Heavy Aircraft Mover," http://www.powertow.com/supertow.html, webpage accessed on Jun. 21, 2010.

Red Box International, "Welcome to Red Box International," http://redboxpower.com/products_toweasy.html, webpage accessed on Jun. 21, 2010.

Robotow, "Robotow," http://www.robotow.com/index.php, webpage accessed on Jun. 21, 2010.

Robotow, "Robotow Products—Portable Airplane Towbars—Plane Adapters," http://www.robotow.com/Products.php?intProductId=23&intAirplaneId=80, webpage accessed on Jun. 21, 2010.

* cited by examiner

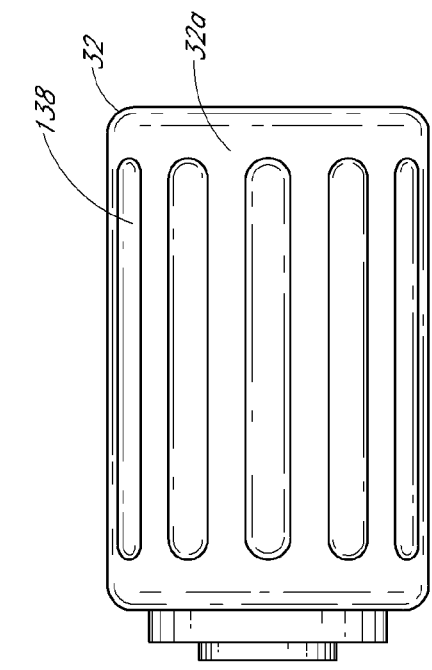
FIG. 11
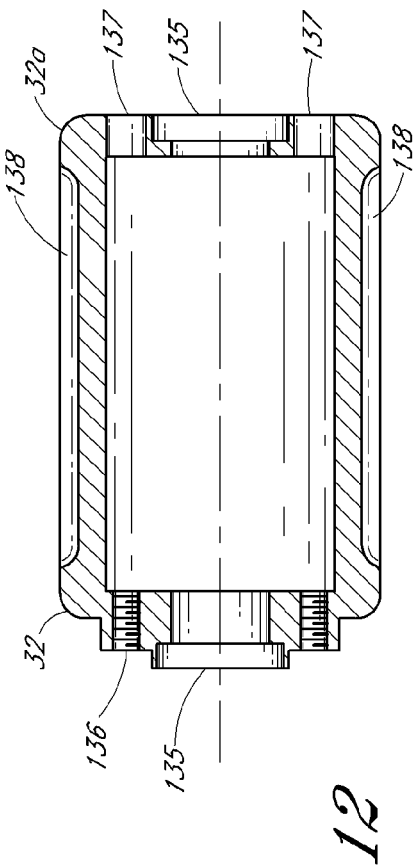
FIG. 10
FIG. 12

AIRCRAFT MOVING DEVICE

RELATED APPLICATIONS

This application claims the benefit under 35 U.S.C. §119 of U.S. Provisional Patent Application No. 61/074,753, filed Jun. 23, 2008 (entitled "SIDEWINDER PORTABLE POWER DRIVER"), which is expressly incorporated by reference in its entirety.

BACKGROUND

1. Technical Field

The present disclosure relates to apparatuses for moving aircraft, in particular to portable apparatuses for maneuvering smaller aircraft.

2. Background

There is a need for small, portable towing apparatuses for maneuvering smaller planes in a hangar, a tarmac, or wherever the need for towing aircraft exists. Pushing or pulling an aircraft without motorized equipment can be difficult for many pilots, who lack sufficient strength to move an aircraft. Additionally, conventional aircraft towing equipment, even for lightweight aircraft, can be too large to carry with the aircraft or to stow within the aircraft. The present disclosure sets forth embodiments of an aircraft moving device that are portable, compact, and lightweight enough to be usable by any pilot to maneuver his or her aircraft, and also to stow or carry within the aircraft itself.

SUMMARY

Some embodiments described herein are directed to apparatuses, systems, and methods for towing aircraft. Moreover, some embodiments are directed to lightweight, portable, handheld apparatuses for moving aircraft arranged to connect with or be supported by a nosewheel of an aircraft.

In particular, some embodiments disclosed herein are directed to a portable tow apparatus for moving an aircraft, comprising a frame, a drive member supported by the frame, the drive member having a portable power source, a contact wheel supported by the frame and configured to be engageable with a nosewheel tire of an aircraft, a transmission portion comprising one or more drive wheels supported by the frame, the drive wheels being rotatable relative to the frame, the transmission portion being configured such that the drive wheels transfer and increase a rotational force produced by the drive member to the contact wheel, and a shaft supported by the frame and configured to be insertable into an opening in a nosewheel assembly of an aircraft, the shaft being movable between a first position and a second position relative to the contact wheel, the shaft being closer to the contact wheel in the second position than in the first position. Additionally, some embodiments of the tow apparatus have a torque arm rotatably supported by the frame and configured to be engageable with the nosewheel assembly of the aircraft, the torque arm being configured to substantially prevent the rotation of the tow apparatus relative to the nosewheel assembly of the aircraft when the torque arm is engaged with the nosewheel assembly of the aircraft.

The drive member may or may not be battery powered. In some embodiments, the drive member can be a right angled, battery powered drill. The shaft can be configured to be insertable into an opening in a nosewheel assembly so that the centerline of the shaft is approximately collinear with the axis of rotation of the nosewheel of the aircraft. The tow apparatus can be configured so that the shaft is securable in the second position after the tow apparatus has been engaged with the nosewheel assembly of an aircraft. In some embodiments, the shaft can be moved between the first position and the second position relative to the contact wheel by rotating a lever arm linked to the shaft.

In some embodiments, the drive wheels can be gears or pulleys. The transmission portion can comprise two or more gears supported by the frame. In particular, without limitation, the transmission portion can comprise four gears supported by the frame. The transmission portion can comprise a chain that is supported by two or more of the gears, or a first chain supported by a first gear and a second gear, and a second chain supported by a third gear and a fourth gear. The second gear can be rotationally linked to the third gear.

In some embodiments, the transmission portion can increase the torque generated by the drive member by a ratio of between approximately 2:1 and approximately 8:1. In some embodiments, the transmission portion can increase the torque generated by the drive member by a ratio of approximately 4:1. In some embodiments, the drive member can securably rotate between a compact position and an extended position relative to the frame, wherein the overall length of tow apparatus is significantly reduced in the compact position as compared to the extended position.

Some embodiments are directed to a method of moving an airplane with a tow apparatus, comprising securing the tow apparatus to a nosewheel assembly of the aircraft so that the tow apparatus is radially secured to the nosewheel assembly, securing the tow apparatus to the nosewheel assembly of the aircraft so that the tow apparatus is rotationally secured to the nosewheel assembly so as to substantially prevent the tow apparatus from rotating relative to an axis of rotation of the nosewheel of the aircraft, activating the drive member so as to cause the nosewheel of the aircraft to rotate, and maneuvering the aircraft to a desired position or orientation.

In some embodiments, the tow apparatus can comprise a contact wheel configured to be engageable with a nosewheel tire of an aircraft, a drive member configured to generate a rotational force, and a transmission portion configured to transfer the rotational force from the drive member to the contact wheel. In some embodiments, the method of moving an airplane with a tow apparatus can further comprise rotating a lever arm so as to bring the contact wheel in contact with the nosewheel of the aircraft. In some embodiments, the method of moving an airplane with a tow apparatus can further comprise rotating a portion of the tow apparatus from a compact position to an extended position, wherein the overall length of tow apparatus is significantly reduced in the compact position as compared to the extended position.

However, it will be appreciated that the apparatuses, systems, and methods disclosed herein can be arranged or modified for moving other types of vehicles including, but not limited to, recreational vehicle trailers, boat trailers, and light duty wheeled carts. In particular, some recreational vehicle trailers, boat trailers, and light duty wheeled carts can be configured to have a specialized wheel and/or a specially configured strut that is adapted to receive at least some embodiments of the tow apparatus disclosed herein. In some embodiments, the tongue wheel (i.e., the wheel that can be supported by the tongue of the trailer near the hitch portion of the trailer) can be replaced with, or configured to have, a wheel that is adapted to receive at least some of the embodiments of the tow apparatus described herein. In some embodiments, the recreational vehicle trailers, boat trailers, and light duty wheeled carts can also be configured to have a strut or other member configured to receive an embodiment of a torque arm so as to prevent or substantially inhibit the rotation of the tow apparatus during operation of the tow apparatus.

BRIEF DESCRIPTION OF THE DRAWINGS

These and other features, aspects and advantages of the present disclosure will now be described in connection with non-exclusive embodiments, in reference to the accompanying drawings. The illustrated embodiments, however, are merely examples and are not intended to be limiting. The following are brief descriptions of the drawings. The drawings may not be drawn to scale.

FIG. 10 is a front view of the embodiment of the drive wheel of the tow apparatus illustrated in FIG. 1.

FIG. 11 is an end view of the embodiment of the drive wheel of the tow apparatus illustrated in FIG. 1.

FIG. 12 is a section view of the embodiment of the drive wheel of the tow apparatus illustrated in FIG. 1, taken through line 12-12 in FIG. 11.

DETAILED DESCRIPTION OF SOME EXEMPLIFYING EMBODIMENTS

The following detailed description is now directed to some exemplifying embodiments. In this description, reference is made to the drawings wherein like parts are designated with like numerals throughout the description and the drawings.

Some embodiments described herein are directed to apparatuses, systems, and methods for towing aircraft. Moreover, some embodiments are directed to lightweight, portable, handheld apparatuses for moving aircraft. However, it will be appreciated that the apparatuses, systems, and methods disclosed herein can be arranged or modified for moving other types of vehicles including, but not limited to, recreational vehicle trailers, boat trailers, and light duty wheeled carts.

In particular, some recreational vehicle trailers, boat trailers, and light duty wheeled carts can be configured to have a specialized wheel and/or a specially configured strut that is adapted to receive at least some embodiments of the tow apparatus disclosed herein. In some embodiments, the tongue wheel (i.e., the wheel that can be supported by the trailer near the hitch or tongue portion of the trailer) can be replaced with, or configured to have, a wheel or hub that is adapted to receive at least some embodiments of the tow apparatus described herein. In some embodiments, the recreational vehicle trailers, boat trailers, and light duty wheeled carts can also be configured to have a strut or other member configured to receive an embodiment of a torque arm so as to prevent or substantially inhibit the rotation of the tow apparatus relative to the tongue wheel during operation of the tow apparatus. Alternatively, in some embodiments, the mounting portion supporting the tongue wheel can be modified to receive and support at least some embodiments of the tow apparatus disclosed herein. Therefore, any reference to aircraft in this disclosure is meant to refer to aircraft, recreational vehicle trailers, boat trailers, light duty wheeled carts, and other suitable vehicles, trailers, or carts.

Figure 1:
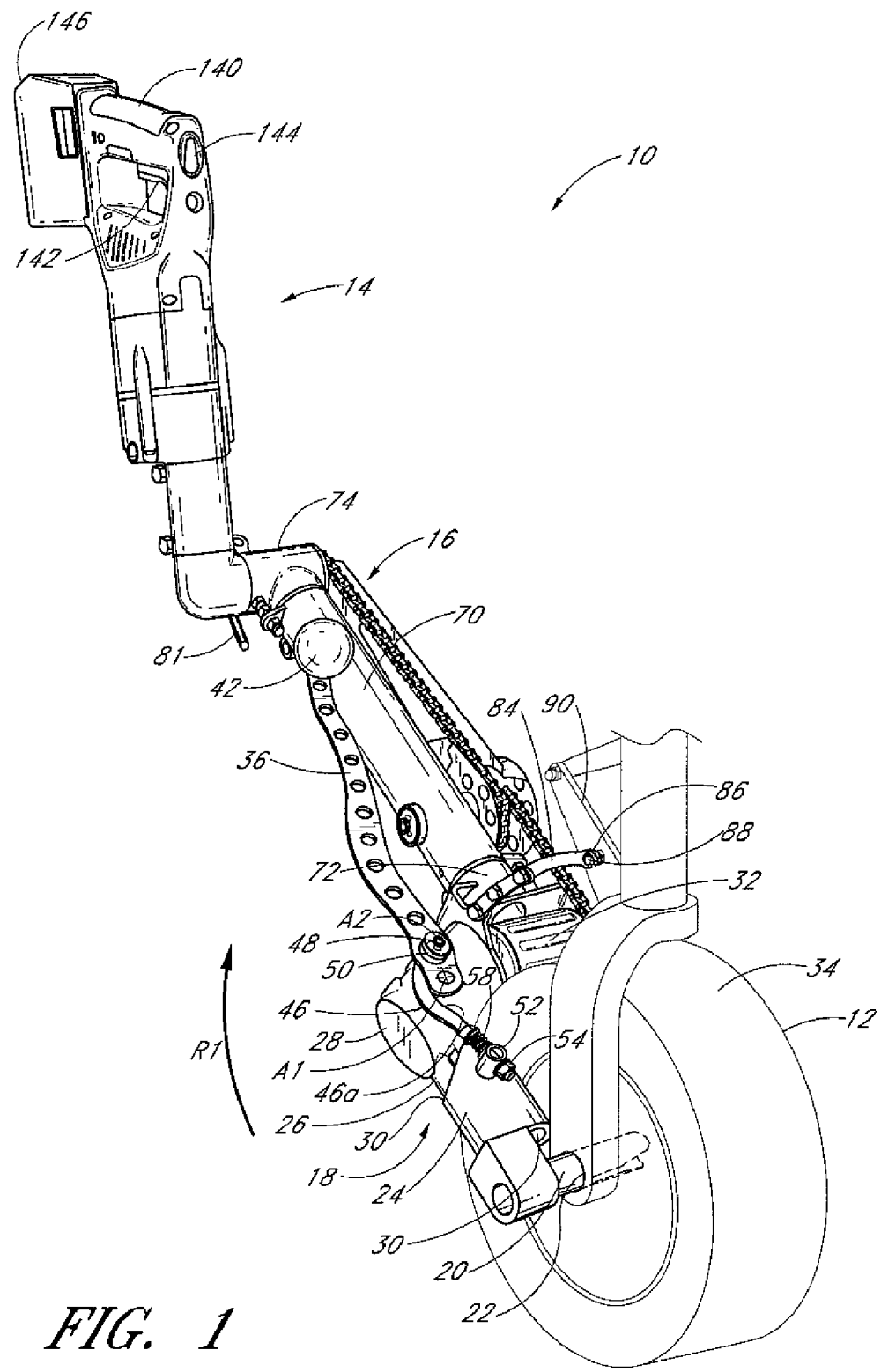
FIG. 1 is a perspective view of an embodiment of a tow apparatus for aircraft.
Figure 2:
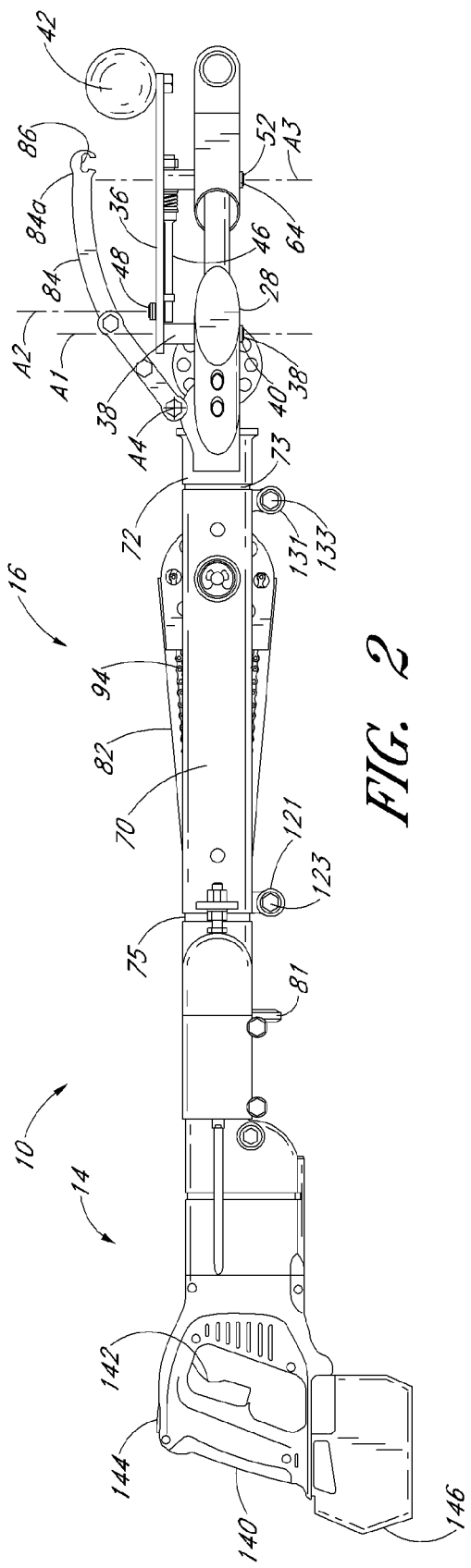
FIG. 2 is a side view of the embodiment of the tow apparatus illustrated in FIG. 1.
Figure 3:
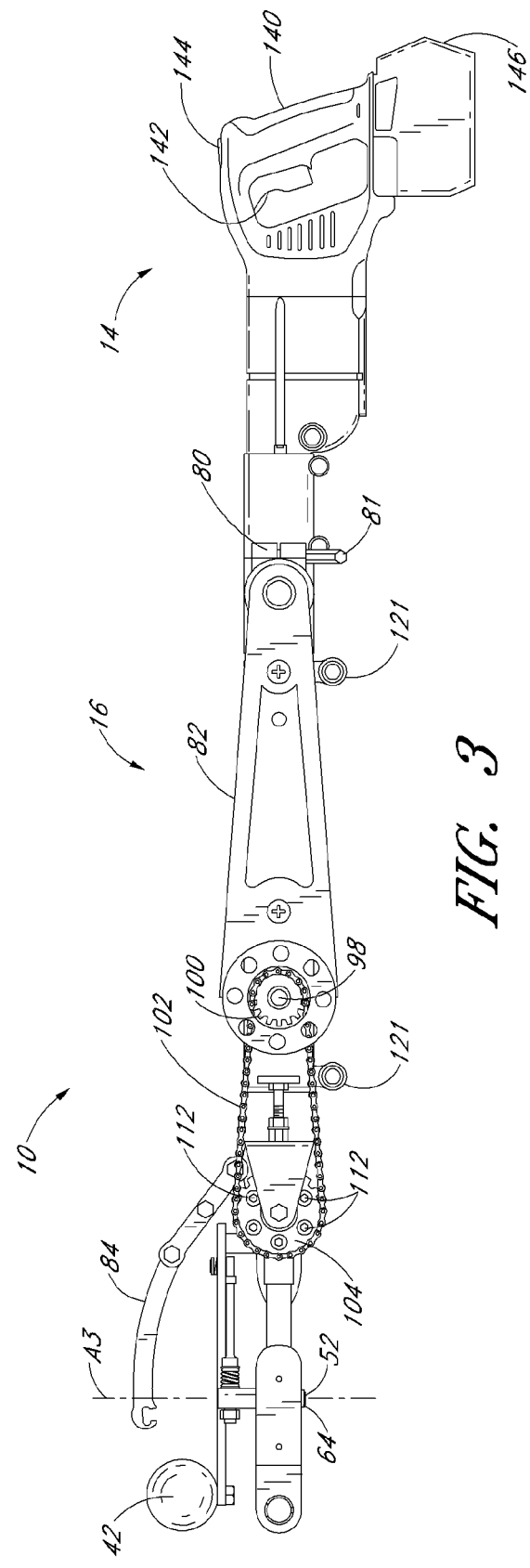
FIG. 3 is another side view of the embodiment of the tow apparatus illustrated in FIG. 1.
Figure 4:
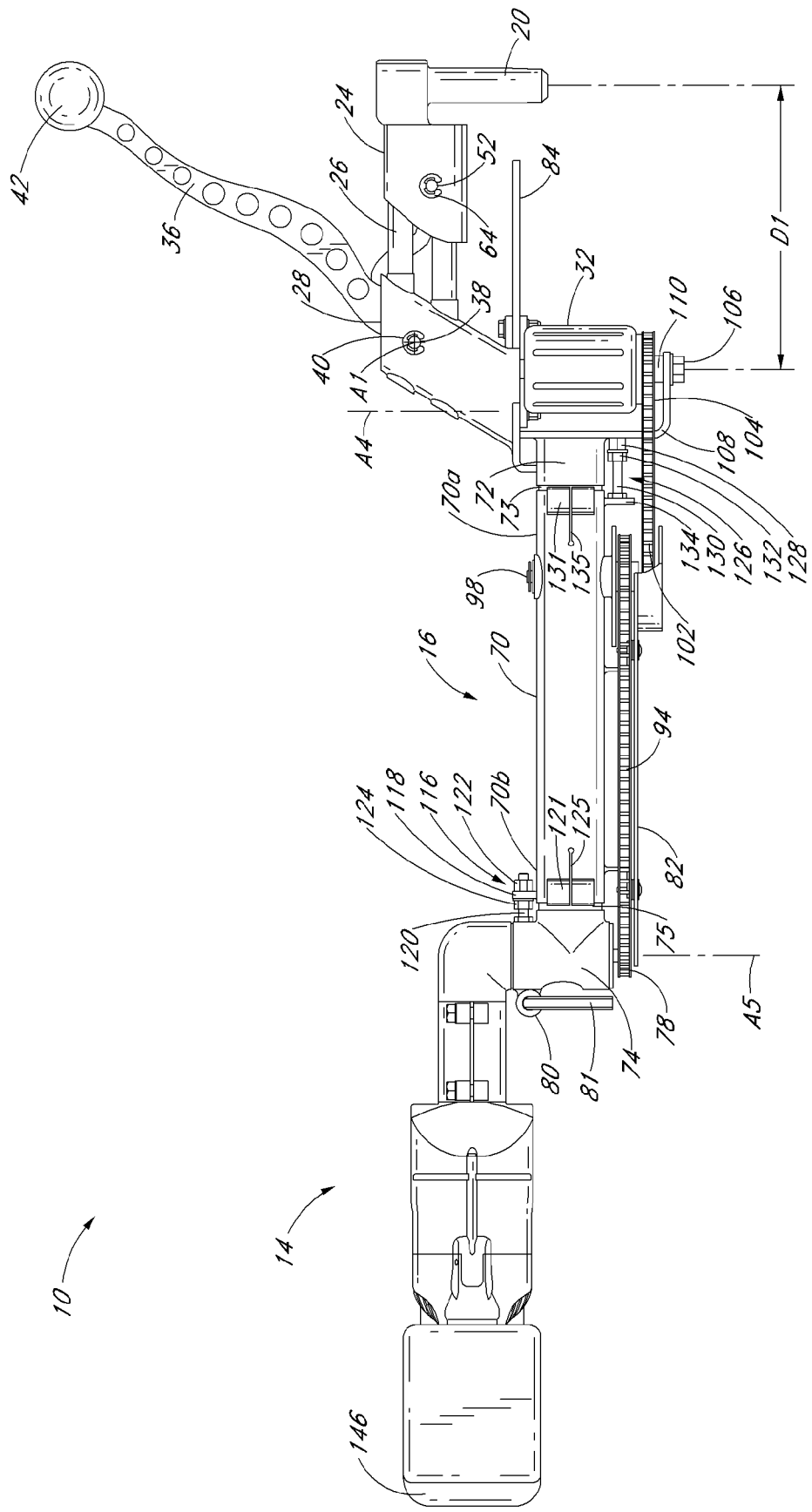
FIG. 4 is a bottom view of the embodiment of the tow apparatus illustrated in FIG. 1.
Figure 5:
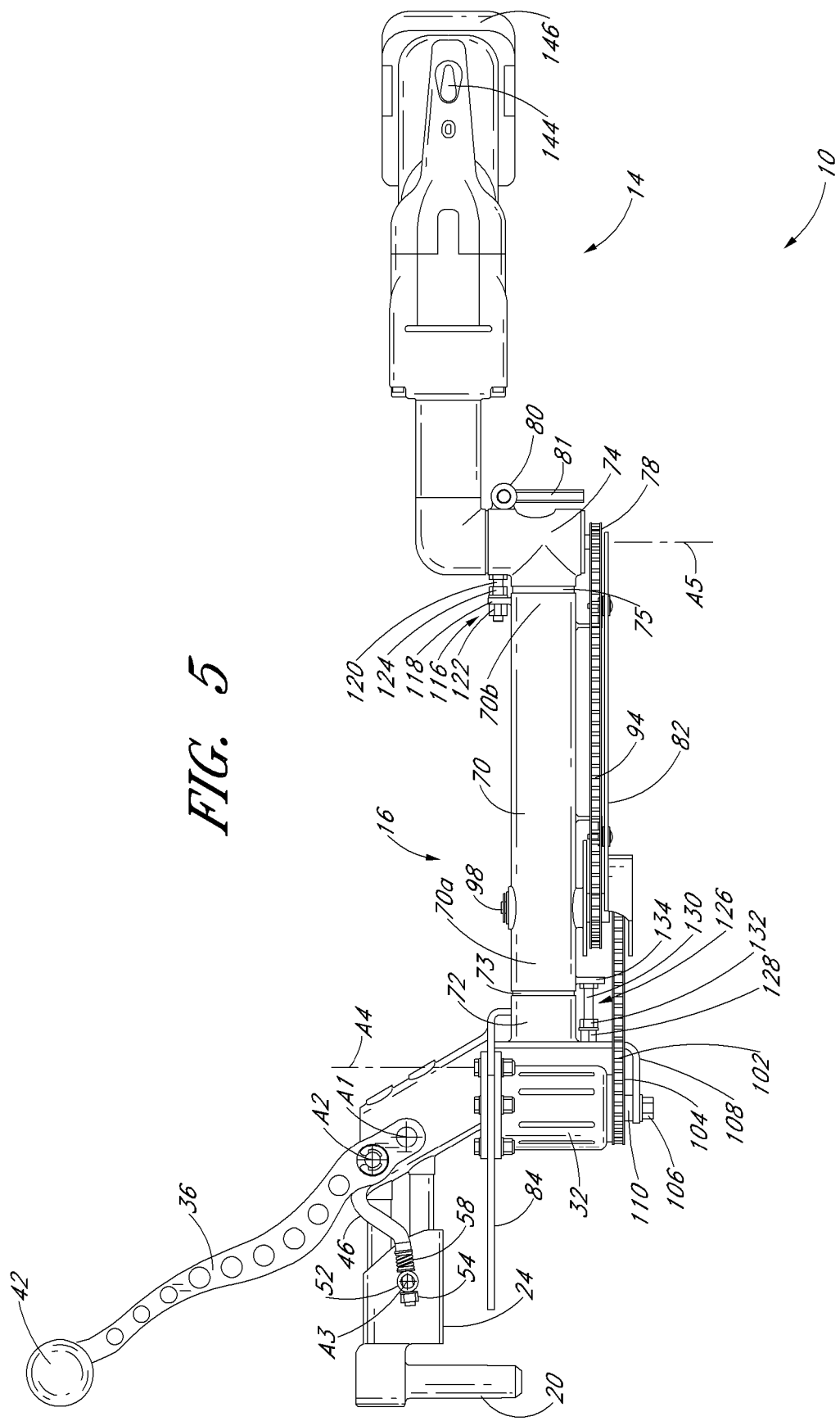
FIG. 5 is a top view of the embodiment of the tow apparatus illustrated in FIG. 1.

FIG. 1 is a perspective view of an embodiment of a tow apparatus 10 for aircraft. As illustrated in FIG. 1, the tow apparatus 10 can be attached to a nosewheel assembly 12 of an aircraft. In this configuration, as will be described in greater detail below, the tow apparatus 10 can rotate the tire of the nosewheel assembly 12 so that an aircraft can be maneuvered. FIGS. 2 and 3 are side views of the embodiment of the tow apparatus 10 illustrated in FIG. 1. FIGS. 4 and 5 are a bottom view and a top view, respectively, of the embodiment of the tow apparatus 10 illustrated in FIG. 1.

In some embodiments, with reference to FIGS. 1-5, the tow apparatus 10 can comprise a drive member 14 (which can be, but is not required to be, a right angle drill or other drive member), a transmission portion 16, and an interface or connecting portion 18. In particular, in some embodiments, the connecting portion 18 can have a pin or shaft 20 that can be configured to be axially received within an opening 22 in the nosewheel assembly 12. The shaft 20 can be sized and configured to be receivable or supportable by a wide range of nosewheel assemblies or vehicle wheels so that the tow apparatus 10 can be used with a wide range of aircraft or other vehicles or trailers. In some embodiments, the shaft 20 can have a slot or a channel formed in an end portion thereof. When the shaft 20 is positioned in the opening 22, the nosewheel assembly 12 can provide radial support to the shaft 20 so as to support the tow apparatus 10 with respect to the nosewheel assembly 12 and the aircraft.

The shaft 20 can be integrally formed with or otherwise supported by a first connecting member 24. In some embodiments, the shaft 20 can be welded, threaded into, adhered to, or otherwise fixed to the first connecting member 24. As will be described in greater detail below, the first connecting member 24 can be axially received by one or more support shafts 26 projecting from a second connecting member 28. In particular, the one or more support shafts 26 can be axially received within one or more openings 30 formed in the first connecting member 24. In the illustrated embodiment, two support shafts 26 projecting from a second connecting member 28 can be axially received within two openings 30 in the first connecting member 24. Additionally, the one or more shafts 26 and one or more openings 30 can each define a circular cross-sectional shape (as illustrated), or a triangular, square, polygonal, or any other suitable cross-sectional shape. The tow apparatus 10 can be configured to have any suitable number of support shafts and/or openings. In some embodiments, as in the illustrated embodiment, the two support shafts 26 can each define a circular cross-section and can each have a diameter between approximately 0.5 in or less and approximately 1.0 in or more.

The first connecting member 24 can be configured to controllably slide along the one or more shafts 26 so as to allow for adjustability of the distance (represented by distance D1 in FIG. 4) between the axial centerline of the shaft 20 and the axial centerline of a contact wheel 32. As will be described in greater detail below, the contact wheel 32 can be configured to directly contact and exert a radial force on an outer surface of a nosewheel tire 34 in response to rotating a lever arm 36 in the direction R1 (shown in FIG. 1) about an axis A1 to a second position, the second position being illustrated in FIG. 1. Further, in this configuration, the contact wheel 32 can be configured to exert a tangential force on the nosewheel tire 34 so as to rotate the nosewheel tire 34 when the contact wheel 32 is rotated by the drive member 14. Thus, some embodiments, the tow apparatus 10 can be configured such that the first connecting member 24 and the shaft 20 can move between a first position and a second position relative to the second connecting member 28 and the contact wheel 32, wherein the distance D1 between the shaft 20 and the contact wheel 32 can be greater in the first position than in the second position.

In the first position, the shaft 20 and the contact wheel 32 can be spaced apart to a distance D1 that is sufficient to permit the tow apparatus 10 to be positioned onto the nosewheel assembly 12. Thereafter, the first connecting member 24 and the shaft 20 can be moved to a second position wherein the contact wheel 32 is moved into contact with an outer surface of the nosewheel tire 34, so that the tow apparatus 10 can be operated to move the aircraft. The tow apparatus 10 is shown in the second position in FIG. 1.

Figure 6:
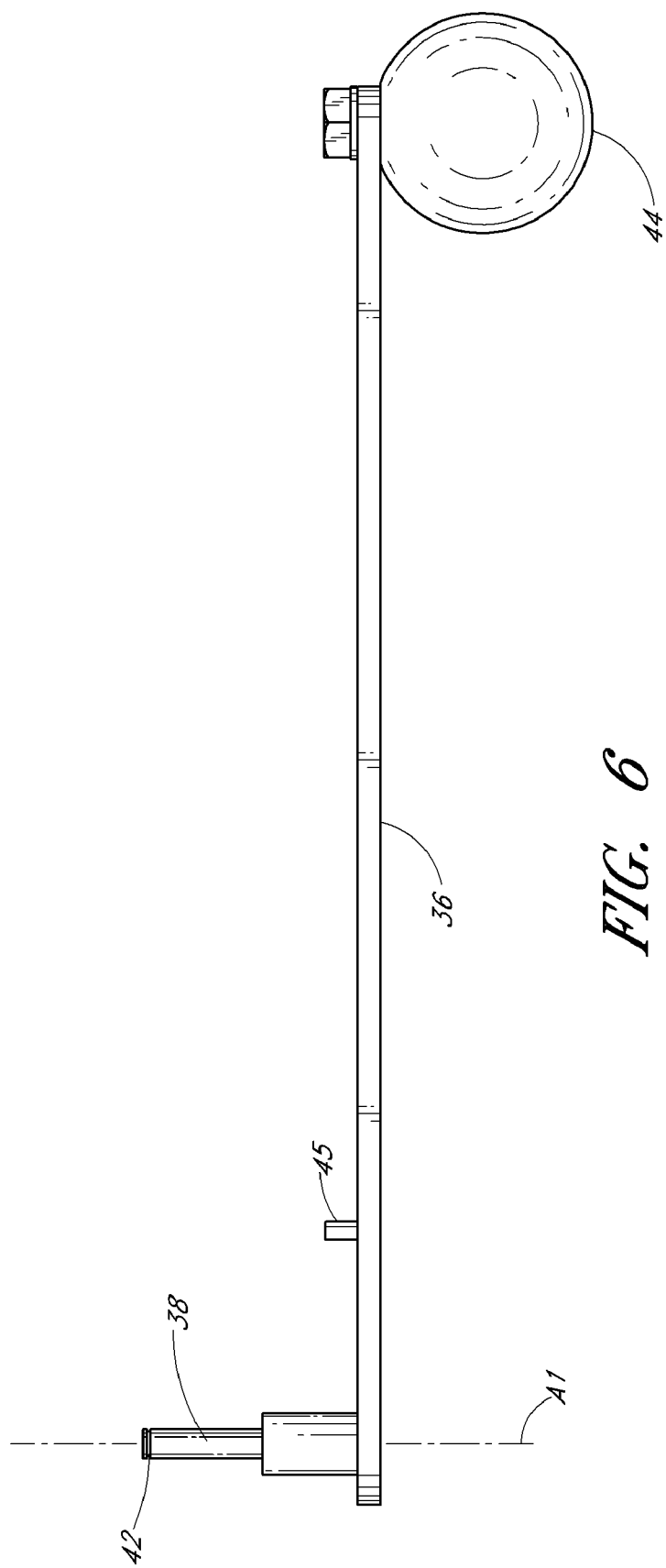
FIG. 6 is a side view of the embodiment of the lever arm shown in FIG. 1.

The first connecting member 24 and the shaft 20 can be moved from the first position to the second position relative to the second connecting member 28 and the contact wheel 32 by rotating a lever arm 36 in direction R1 about an axis A1, axis A1 being shown in FIGS. 2, 5, and 6. FIG. 6 is a side view of the embodiment of the lever arm 36 shown in FIG. 1. In some embodiments, as shown most clearly in FIGS. 2 and 6, a shaft 38 can project from the lever arm 36. The shaft 38 can be integrally formed with, welded to, or otherwise fastened to or supported by the lever arm 36 so that the shaft 38 and the lever arm 36 rotate as a single unit. The shaft 38 can be configured to pass through an opening in the second connecting member 28 and be axially secured to the second connecting member 28 with a fastener 40 such as a C-clip, a nut assembly, or other suitable fastener that is configured to axially secure the shaft 38 to the second connecting member 28. With reference to FIG. 6, the shaft 38 can be sized and configured such that only a portion of the shaft 38 can pass through the opening in the second connecting member 28. Alternatively, in some embodiments (not illustrated), a shaft can project from the second connecting member 28, the shaft being arranged so that the lever arm 36 can be supported thereby and can rotate relative to the shaft about axis A1.

As shown in FIG. 6, in some embodiments, an annular channel 42 can be formed in an end portion of the shaft 38 to receive a C-clip after the shaft 38 has been passed through the second connecting member 28. In some embodiments (not illustrated), the end portion of the shaft 38 can be threaded so as to receive a nut (not illustrated) after the shaft 38 has been passed through the second connecting member 28. In this configuration, the shaft 38 and, hence, the lever arm 36, can rotate as a single unit relative to the second connecting member 28. A rotatable, spherical knob or other handle 44 can be supported at an end portion of the lever arm 36 to facilitate a user's grasp and/or rotation of the lever arm 36. Further, with reference to FIG. 6, a rotational stop or tab 45 can project from the lever arm 36. The tab 45 can be configured to limit the range of rotation of the lever arm 36 by abutting against an outside surface of a connecting arm 46 or other object or surface of the tow assembly 10 once the lever arm 36 reaches a desired maximum rotational position.

Figure 7:
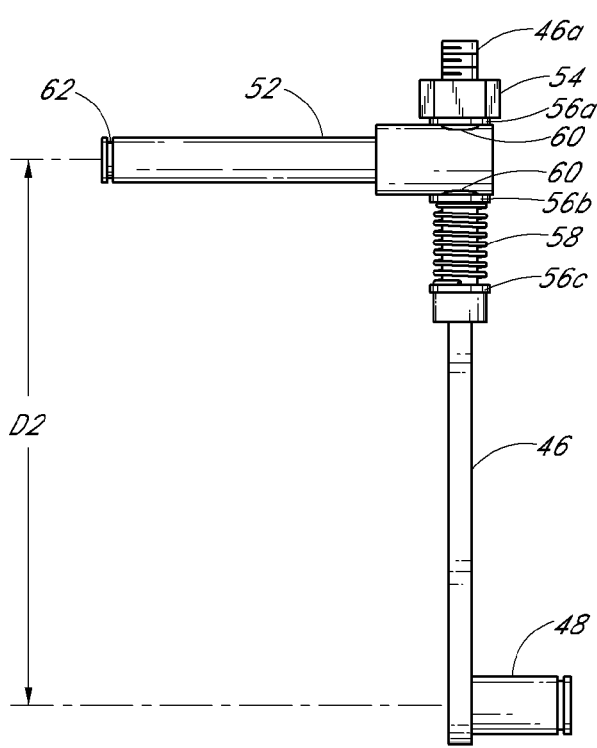
FIG. 7 is a side view of the embodiment of the connecting arm shown in FIG. 1.
Figure 8:
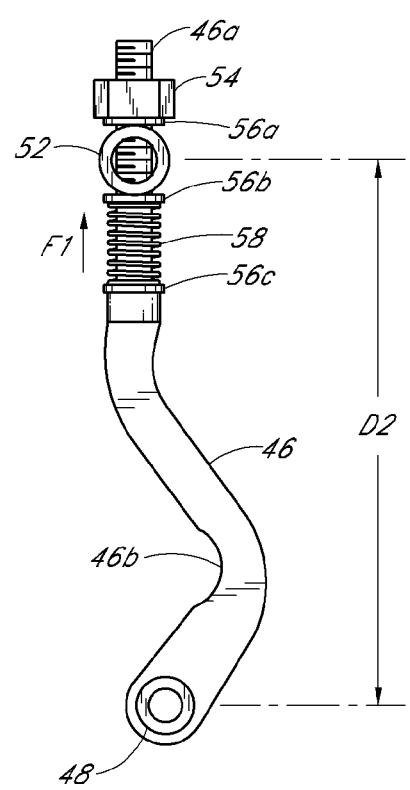
FIG. 8 is a top view of the embodiment of the connecting arm shown in FIG. 1.

With reference to FIG. 1, the connecting arm 46 can provide linkage or a connection between the lever arm 36 and the first connecting member 24. FIGS. 7 and 8 are a side view and a top view, respectively, of the embodiment of the connecting arm 46 shown in FIG. 1. In some embodiments, as shown most clearly in FIGS. 7 and 8, a shaft 48 can project from the connecting arm 46. The shaft 48 can be integrally formed with, welded to, or otherwise fastened to or supported by the connecting arm 46 so that the shaft 48 and the connecting arm 46 rotate as a single unit about axis A2 (shown in FIG. 1) relative to the lever arm 36.

As illustrated in FIG. 1, the shaft 48 can be configured to pass through an opening in the lever arm 36 and be axially secured to the lever arm 36 with a fastener 50 such as a C-clip, a nut assembly, or other suitable fastener that is configured to axially secure the shaft 48 to the lever arm 46. Thus, the shaft 48 can have a longitudinal axis that is coaxial with axis A2. Alternatively, in some embodiments (not illustrated), a shaft can project from the lever arm 36, the shaft and the connecting arm 46 being arranged so that the connecting arm 46 can be supported by the shaft and so that the connecting arm 46 can rotate relative to the shaft about axis A2.

Additionally, as shown most clearly in FIGS. 7 and 8, a second shaft 52 can be supported by the connecting arm 46 so that the shaft 52 projects in a direction that is opposite to that of the shaft 48. A nut 54 or other suitable fastener can be threadably engaged with or otherwise attached to the end portion 46a of the connecting arm 46 to secure the connecting arm 46 to the shaft 52. Accordingly, in some embodiments, the end portion 46a of the connecting arm 46 can be threaded. A washer 56a can be positioned between the shaft 52 and the nut 54. A spring member 58 can be positioned between a pair of washers 56b, 56c. The spring member 58 can be configured to exert a force F1 on the shaft 52 in a direction represented by arrow F1 in FIG. 8.

In some embodiments, as most clearly illustrated in FIG. 7, the connecting arm 46 can be configured to pass axially through a pair of openings 60 formed in the shaft 52 in a direction that is transverse to the longitudinal axis of the shaft 52. The openings 60 can be sized and configured to permit the connecting arm 46 to pass freely through the openings in the axial direction of the connecting arm 46, but to generally radially restrain the connecting arm 46 relative to the shaft 52. In this configuration, the shaft 52 and, hence, the connecting arm 46, can rotate generally as a single unit about the longitudinal axis of the shaft 52.

As shown in FIG. 7, in some embodiments, an annular channel 62 can be formed in an end portion of the shaft 52 to receive a C-clip after the shaft 52 has been passed through the opening in the first connecting member 24. In some embodiments (not illustrated), the end portion of the shaft 52 can be threaded so as to receive a nut after the shaft 52 has been passed through the opening in the first connecting member 24.

With reference to FIGS. 1-3, as mentioned, the shaft 52 can be sized and configured to pass through an opening in the first connecting member 24 and be axially secured to the first connecting member 24 with a fastener 64 such as a C-clip, a nut assembly, or other suitable fastener that is configured to axially secure the shaft 52 to the first connecting member 24. The tow apparatus 10 can be configured so that the connecting member 46 and the shaft 52 rotate relative to the first connecting member 24 about axis A3. With reference to FIG. 7, the shaft 52 can be sized and configured such that only a portion of the shaft 52 can pass through the opening in the first connecting member 24. In some embodiments (not illustrated), a shaft can project from the first connecting member 24, the shaft being arranged so that the connecting arm 46 can rotate relative to the shaft about axis A3 (shown in FIG. 5).

In some embodiments, a distance (represented by D2 in FIGS. 7 and 8) between the axial centerline of the shaft 48 and the axial centerline of the shaft 52 can be adjusted by either tightening or loosening the nut 54 relative to the connecting arm 46. In other words, the distance D2 can be reduced by tightening the nut 54 relative to the connecting arm 46, and the distance D2 can be increased by loosening the nut 54 relative to the connecting arm 46. In some embodiments, the distance D2 can be adjusted to accommodate nosewheels of a range of sizes. In some embodiments, the nut 54 can be sized and configured so as to be rotatable by hand. Accordingly, in some embodiments, the nut can have a knurled outer surface and be sized so that a user can turn the nut 54 against the bias force of the spring member 58.

Additionally, as clearly shown in FIG. 8, in some embodiments, the connecting arm 46 can have a curved portion 46 being configured to curve around the shaft 30 when the lever arm 36 and, hence, the tow assembly 10 are in the second position (as illustrated in FIG. 1). As will be described in greater detail below, this arrangement can cause the lever arm 36 to be biased to remain in the second position after the lever arm 36 has been moved to the second position. Thus, when the tow apparatus 10 is connected to a nosewheel assembly 12, rotating the lever arm 36 in direction R1 about axis A1 to the second position can cause the connecting member 46 to pull the contact wheel 32 closer to the first connecting member 24 and, hence, the shaft 20, so as to draw the contact wheel 32 into contact with the nosewheel tire 34.

As mentioned above, the tow apparatus 10 can have a transmission portion 16 that is configured to transfer the rotational force or torque from the drive member 14 to the contact wheel 32. With reference to FIG. 4, in some embodiments, the transmission portion 16 can have or can be supported by a frame that can comprise a tubular member 70, a first end bracket 72, and a second end bracket 74. As illustrated most clearly in FIG. 4, the tubular member 70 can have a first end portion 70a and a second end portion 70b. The first end bracket 72 can be configured to engage with the first end portion 70a of the tubular member 70 so that the first end bracket 72 is radially supported by the tubular member 70.

In particular, the tubular member 70 and the first end bracket 72 can be configured such that a portion of the first end bracket 72 can be axially received within an opening formed in the first end portion 70a of the tubular member 70. With reference to FIGS. 4 and 5, in some embodiments, the first end bracket 72 can have a tubular projection 73 having an outside diameter that is slightly smaller than the inside diameter of the first end portion 70a of the tubular member 70, so that the tubular projection 73 can slide within the first end portion 70a of the tubular member 70. In some embodiments, the diameter of the tubular projection 73 can be approximately 2.375 in. In this configuration, the first end bracket 72 can be selectively longitudinally movable relative to the tubular member 70 so that, as will be discussed, the second drive chain tension can be adjusted.

Similarly, the tubular member 70 and the second end bracket 74 can be configured such that a portion of the second end bracket 74 can be axially received within an opening formed in the second end portion 70b of the tubular member 70. With reference to FIGS. 4 and 5, in some embodiments, the second end bracket 74 can have a tubular projection 75 having an outside diameter that is slightly smaller than the inside diameter of the second end portion 70b of the tubular member 70, so that the tubular projection 75 can slide within the second end portion 70b of the tubular member 70. In some embodiments, the diameter of the tubular projection 75 can be approximately 2.375 in. In this configuration, the second end bracket 74 can be selectively longitudinally movable relative to the tubular member 70 so that, as will be discussed, the first drive chain tension can be adjusted.

In some embodiments, the tubular member 70, the first end bracket 72, and the second end bracket 74 can have a tubular cross-section, as shown. In some embodiments, the circular member 70, the first end bracket 72, and the second end bracket 74 can have a triangular, square, polygonal, or any other suitable cross-sectional shape.

In some embodiments, the drive member 14 can be a cordless, right angle driver such as, but not limited to, the right angle drill manufactured by MILWAUKEE. As illustrated most clearly in FIGS. 3-5, the driveshaft of the drive member or right angle drill 14 can be coupled to a first drive wheel or gear 78 supported by apparatus 10 adjacent to the second end bracket 74. Additionally, the tow apparatus 10 can be configured such that the drive member 14 can rotate about axis A5 (shown in FIG. 4) relative to the second end bracket 74 so that the tow apparatus 10 can be folded into a more compact configuration. The tow apparatus 10 can also be configured so that the drive member 14 can be secured to the second end bracket 74 so that the drive member 14 cannot become inadvertently disengaged from the second end bracket 74 or the transmission portion 16.

A clamping mechanism 80 comprising a bolt having a handle 81 rotationally and axially secured to the bolt can be used to tighten the clamping mechanism 80 so that, when the clamping mechanism 80 is tightened, the clamping mechanism 80 constricts around a portion of the drive member 14 and limits or substantially prevents the rotational movement of the drive member 14 relative to the second end bracket 74. Similarly, the tow apparatus 10 can be configured such that, when the clamping mechanism 80 is loosened, the drive member 14 can freely rotate about axis A5 (shown in FIG. 4) relative to the second end bracket 74 and, hence, relative to the transmission portion 16. As will be described in greater detail below, by loosening the clamping mechanism 80 and rotating the drive member 14 relative to the transmission portion 16 about axis A5, the drive member 14 can be rotated into a more compact configuration for transportation of the apparatus 10. Finally, a chain guard 82 can be supported by the tubular member 70 and can be sized and configured to cover the gear 78 as well as some or all of the other gears and/or chains or portions of the chain supported by the transmission portion 16.

As shown in FIGS. 1-5, a torque arm 84 (also referred to herein as the anti-torque arm) can also be supported by the first end bracket 72, as illustrated in FIG. 1. As will be described, the torque arm 84 can substantially reduce or prevent any rotational movement of the tow assembly 10 relative to the nosewheel 34 during operation of the tow assembly 10. With reference to FIGS. 2 and 5, the torque arm 84 can be bolted or otherwise fastened to a flange on the first end bracket 72 and can be configured to rotate about an axis A4 relative to the first end bracket 72. As shown most clearly in FIG. 2, the torque arm 84 can have an opening or slot 86 formed in a portion of the free end 84a of the torque arm 84. As shown in FIG. 1, the torque arm 84 can be configured so that the slot 86 engages with a shaft, bolt, or other suitable feature 88 protruding from or supported by a member 90 of the nosewheel assembly 12. As mentioned, when the torque arm 84 is engaged with the bolt or shaft 88 supported by the member 90, the torque arm 84 can exert a circumferential or tangential force on the tow assembly 10 relative to the nosewheel 12 of the aircraft so as to substantially reduce or prevent the tow assembly 10 from rotating relative to the nosewheel assembly 12 during operation.

Figure 9:
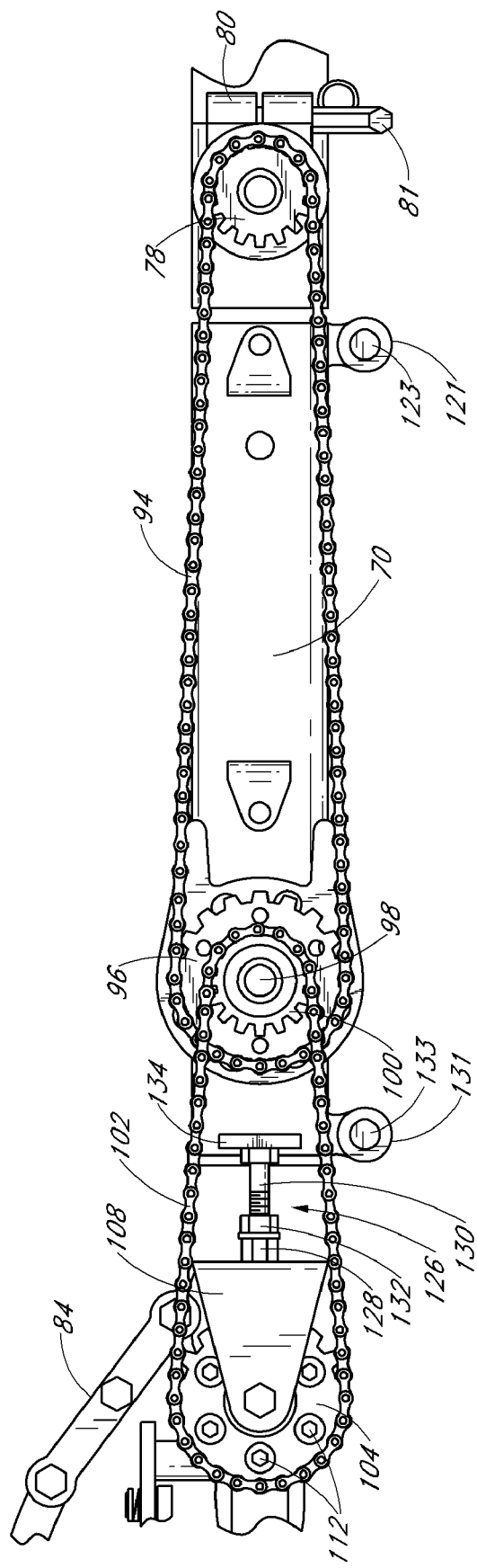
FIG. 9 is an enlarged side view of a portion of the embodiment of the tow apparatus illustrated in FIG. 1, showing the tow apparatus with the embodiment of the chain cover removed.

As will be described, the transmission portion 16 can be configured to transfer an optimal amount of torque and rotational speed from the drive member 14 to the contact wheel 32. FIG. 9 is an enlarged side view of a portion of the embodiment of the tow apparatus 10 illustrated in FIG. 1, showing the tow apparatus 10 with the chain cover 82 (not illustrated) removed for clarity. As discussed above, the first gear 78 can be in communication with the right angle drive member 14. The first gear 78 can be configured to drive a first drive belt or chain 94 or other belt or drive component. The first chain 94 can, in turn, drive or rotate a second drive wheel or gear 96 supported by a shaft 98 that is supported by the tubular member 70. The shaft 98 can have bushings or bearings supported by the tubular member 70 to facilitate the rotation of the shaft relative to the tubular member 70. A third drive wheel or gear 100 can also be supported by the shaft 98 or by the gear 96 so as to be rotationally linked to the second gear 96. In other words, the second and third gears 96, 100 can be configured such that the rotation of the second gear 96 will cause the simultaneous rotation of the third gear 100.

Similarly, the third gear 100 can be configured to drive a second drive belt or chain 102 or other belt or drive component. A second chain 102 can, in turn, drive or rotate a fourth drive wheel or gear 104. In some embodiments, the fourth gear 104 can be supported by the contact wheel 32 or a shaft 106 (shown most clearly in FIGS. 4 and 9) that is coaxial with and supports the contact wheel 32. In some embodiments, as in the illustrated embodiment, the shaft 106 can be a bolt. In some embodiments, a flange or bracket 108 supported by the first end bracket 72 can support the shaft or bolt 106 and, hence, the fourth gear 104 and the contact wheel 32. With reference to FIG. 4, a bushing 110 can be positioned between the fourth gear 104 and the bracket 108. Additionally, the contact wheel 32, the fourth gear 104, and/or the shaft 106 can be supported by bushings or bearings to facilitate the rotation of the contact wheel 32 and/or the fourth gear 104 relative to the bracket 108.

In some embodiments, the fourth gear 104 can be welded, bolted, or otherwise secured to the contact wheel 32 so as to be rotationally locked to the contact wheel 32, such that the rotation of either of the fourth gear 104 and the contact wheel 32 will cause the simultaneous and equal rotation of the other of the fourth gear 104 and the contact wheel 32. For example, without limitation, the fourth gear 104 can be bolted to the contact wheel 32 with one or more bolts 112 threadedly received by the contact wheel 32.

Thus, in this configuration, when the first gear 78 is rotated by the drive member 14, the first gear 78 can drive a first chain 94 which in turn can simultaneously rotate the second and third gears 96, 100. The rotation of the third gear 100 can drive a second chain 102 which in turn can rotate a fourth gear 104 and the contact wheel 32.

In some embodiments, and the diameter and number of teeth of second gear 96 the can be approximately twice the diameter and number of teeth of the first gear 78 such that the gear ratio between the second gear 96 and the first gear 78 is approximately 2:1. In some embodiments, the diameter and number of teeth of the second gear 96 can be slightly less than or slightly greater than approximately twice the diameter and number of teeth of the first gear 78, depending on the amount of torque and/or rotational velocity a user desires to transfer to the contact wheel 32.

In some embodiments, the diameter and number of teeth of the third gear 100 can be approximately one-half of the diameter and number of teeth of the second gear 96. In some embodiments, the diameter and number of teeth of the third gear 100 can be slightly less than or slightly greater than approximately one-half of the diameter and number of teeth of the second gear 96, depending on the amount of torque and/or rotational velocity a user desires to transfer to the contact wheel 32.

In some embodiments, the diameter and number of teeth of the fourth gear 104 can be approximately twice the diameter and number of teeth of the third gear 100 such that the gear ratio between the third gear 100 and the second gear 96 is approximately 2:1. In some embodiments, the diameter and number of teeth of the fourth gear 104 can be slightly less than or slightly greater than approximately twice the diameter and number of teeth of the third gear 100, depending on the amount of torque and/or rotational velocity a user desires to transfer to the contact wheel 32. In some embodiments, the third gear 100 can have approximately the same diameter and number of teeth as compared to the first gear 78.

In sum, in some embodiments, the gear ratio of the transmission portion 16 comprising the first, second, third, and fourth gears 78, 96, 100, 104 can be approximately 4:1. In this configuration, the amount of torque produced by the drive member 14 can be increased by a ratio of 4:1 with the above-described transmission portion 16 of the tow assembly 10. In some embodiments, the tow apparatus 10 can be configured so that the gear ratio of the transmission portion 14 can be between approximately 2:1 and approximately 8:1 such that the amount of torque produced by the drive member 14 can be increased by a ratio of between approximately 2:1 and approximately 8:1, with the above-described transmission portion 16 of the tow assembly 10.

Thus, configuring the transmission portion 16 as described above can significantly increase the torque exerted by the drive member 14 on the contact wheel 32. In some embodiments, the transmission portion 16 can be configured to increase the resulting torque produced by the drive member 14 on the contact wheel 32 by approximately 400%. In some embodiments, the transmission portion 16 can be configured to increase the resulting torque produced by the drive member 14 on the contact wheel 32 from approximately 200% or less to approximately 600% or more, or from approximately 300% or less to approximately 500%.

The first and second chains 94, 102 can have the same pitch. In some embodiments, the tension of the first and second chains 94, 102 can be adjusted with one or more tension adjusters. In particular, with reference to FIG. 4, a first tension adjuster 116 can be supported by the tubular member 70, the first tension adjuster 116 being configured to allow the adjustability of the first chain 94. In particular, in some embodiments, a flange 118 can be welded, bolted, or otherwise attached to or supported by the tubular member 70, the flange 118 can have an opening therethrough configured to axially receive an adjustment bolt 120, and can have a flange nut 122 welded, bolted, or otherwise attached to or supported by the flange 118 and configured to threadedly receive the bolt 120. Further, a locking nut 124 can be positioned on the bolt 120 and can be configured to be tightened against the flange 118 so as to inhibit or substantially prevent the inadvertent rotation of the bolt 120 when the locking nut 124 is tightened against the flange 118.

As illustrated in FIG. 4, the bolt 120 can be threadedly engaged with from the flange nut 122 so that the head of the bolt 120 can abut against the second end bracket 74. When the bolt 120 is unthreaded from the flange nut 122 so that the head of the bolt 120 abuts the second end bracket 74, further unthreading of the bolt 120 from the flange nut 122 can cause the bolt 120 to exert a force on the second end bracket 74, causing the second end bracket 74 to move apart from the tubular member 70. This unthreading of the bolt 120 can cause the first chain 94 to be tightened. Threading the bolt 120 into the flange nut 122 can allow the second end bracket 74 to move toward the tubular member 70, thus allowing the first chain 94 to be loosened. After the desired tension of the first chain 94 is achieved, the tightening nut 124 can be tightened against the flange 118 so as to secure the bolt 120 is the desired position relative to the flange 118.

Additionally, with reference to FIGS. 2-4, the second end portion 70b of the tubular member 70 can have a pinch boss or clamping mechanism 121 welded to, attached to, or otherwise supported thereon. The clamping mechanism 121 can support a bolt 123 therein that can be threadedly received by a portion of the clamping mechanism 121. Further, the second end portion 70b of the tubular member 70 can further have a channel or slot 125 formed therein. The clamping mechanism 121, bolt 123, and the slot 125 can be configured to allow the user to substantially prevent the second end portion 70b of the tubular member 70 from moving longitudinally relative to the second end bracket 74 by tightening the bolt 123 to draw the sides of the slot 125 together, thereby decreasing the diameter of the second end portion 70b of the tubular member 70 and constricting the second end portion 70b of the tubular member 70 around the second end bracket 74 or the tubular projection 75 supported by the second end bracket 74.

The bolt 123 and, hence, the clamping mechanism 121, can be loosened to permit the second end portion 70b of the tubular member 70 to slide relative to the second end bracket 74 during adjustment of the first chain 94. Similarly, the bolt 123 and, hence, the clamping mechanism 121, can be tightened to secure the second end portion 70b of the tubular member 70 to the second end bracket 74 after the tension of the first chain 94 has been adjusted.

Similarly, with reference to FIG. 4, a second tension adjuster 126 can be supported by the tubular member 70, the second tension adjuster 126 being configured to allow the adjustability of the second chain 102. In particular, in some embodiments, a threaded flange or nut 128 can be welded, bolted, or otherwise attached to or supported by the bracket 108 so that the nut 128 is substantially prevented from rotating relative to the bracket 108. The threaded flange or nut 128 can be configured to threadedly receive an adjustment bolt 130. Further, a locking nut 132 can be positioned on the bolt 130 and can be configured to be tightened against the nut 128 so as to inhibit or substantially prevent the inadvertent rotation of the bolt 130 relative to the nut 128 when the locking nut 132 is tightened against the nut 128. A flange 134 can be welded, bolted, or otherwise attached to or supported by the tubular member 70.

As illustrated in FIG. 4, the bolt 130 can be unthreaded from the nut 128 supported by the bracket 108 so that the head of the bolt 130 can abut against the flange 134 supported by the tubular member 70. When the bolt 130 is unthreaded from the nut 128 so that the head of the bolt 130 abuts the flange 134, further unthreading of the bolt 130 from the nut 128 can cause the bolt 130 to exert a force on the flange 134 and, hence, the tubular member 70. This force can cause the flange 134, the tubular member 70, and, hence, the third gear 100 to move apart from the bracket 108 and fourth gear 104 and, thus, cause the second chain 102 to be tightened. Threading the bolt 130 into the nut 128 can allow the bracket 108 and fourth gear 104 to move closer to the flange 134, the tubular member 70, and the third gear 100, thus allowing the second chain 102 to be loosened. After the desired tension of the second chain 102 is achieved, the tightening nut 132 can be tightened against the nut 128 so as to secure the bolt 130 is the desired position relative to the nut 128 and, hence, the bracket 108.

Again, with reference to FIGS. 2-4, the first end portion 70a of the tubular member 70 can have a pinch boss or clamping mechanism 131 welded to, attached to, or otherwise supported thereon. The clamping mechanism 131 can support a bolt 133 therein that can be threadedly received by a portion of the clamping mechanism 131. Further, the first end portion 70a of the tubular member 70 can further have a channel or slot 135 formed therein. The clamping mechanism 131, bolt 133, and the slot 135 can be configured to allow the user to substantially prevent the first end portion 70a of the tubular member 70 from moving longitudinally relative to the first end bracket 72 by tightening the bolt 133 to draw the sides of the slot 135 together, thereby decreasing the diameter of the first end portion 70a of the tubular member 70 and constricting the first end portion 70a of the tubular member 70 around the first end bracket 72 or the tubular projection 73 supported by the first end bracket 72.

The bolt 133 and, hence, the clamping mechanism 131, can be loosened to permit the first end portion 70a of the tubular member 70 to slide relative to the first end bracket 72 during adjustment of the second chain 102. Similarly, the bolt 133 and, hence, the clamping mechanism 131, can be tightened to secure the first end portion 70a of the tubular member 70 to the first end bracket 72 after the tension of the second chain 102 has been adjusted.

In some embodiments, the transmission portion 16 can comprise one or more drive belts in place of the one or more drive chains described above. Similarly, in some embodiments, the transmission portion 16 can comprise one or more wheels or pulleys in place of the one or more drive gears described above. In this configuration, not illustrated, the one or more pulleys and one or more belts can be configured to transfer the torque produced by the drive member 14 to the contact wheel 32, so as to allow the tow apparatus 10 to rotate a nosewheel 34 of an aircraft. Further, in this configuration, not illustrated, the one or more pulleys and one or more belts can be configured to increase the torque produced by the drive member 14 so as to increase the torque that is transferred to the contact wheel 32.

FIGS. 10 and 11 are a front view and an end view, respectively, of the embodiment of the contact wheel 32 of the tow assembly 10 illustrated Win FIG. 1. FIG. 12 is a section view of the embodiment of the contact wheel 32 of the tow assembly 10 illustrated in FIG. 1, taken through line 12-12 in FIG. 11. With reference to FIGS. 10-12, in some embodiments, the contact wheel 32 can have a generally cylindrically shaped outer surface 32a, and an opening 135 therethrough that is generally concentric with the outer surface 32a. The opening 135 can be configured to receive the shaft 106 described above. In some embodiments, the opening 135 can be configured to support one or more bearings to facilitate the rotation of the contact wheel 32 about the shaft 106.

As mentioned above, in some embodiments, the fourth gear 104 can be bolted to the contact wheel 32 with one or more bolts 112 threadedly received by the contact wheel 32.

In particular, in some embodiments, openings 136 can be configured to threadedly receive the bolts 112 used to support the fourth gear 104. Additional openings 137 can be formed in a radial array around the opening 135. In some embodiments, the openings 137 can reduce the weight of the contact wheel 32. Slots or depressions 138 can be formed in the outer surface 32a of the contact wheel 32, the depressions 138 being formed parallel to the axial centerline of the contact wheel 32. The depressions 138 can be configured to enhance the traction of the outer surface 32a of the contact wheel 32 relative to the nosewheel 34 of the aircraft during operation of the tow assembly 10. In some embodiments, the depressions 138 can reduce the weight of the contact wheel 32.

As illustrated in FIG. 1, the drive member 14 can be a handheld, right-angle driver having a handgrip portion 140 and a trigger 142 that can be operated by a user's forefinger. Additionally, the direction of rotation of the drive member 14 can be reversible so as to allow a user to change the direction of rotation of the contact wheel 32 and, hence, the aircraft nosewheel 34. In particular, with reference to FIG. 1, the drive member 14 can have a switch 144 that can permit a user to change the direction of rotation of the contact wheel 32 and, hence, the aircraft by moving the switch 144 from one position to another position. In some embodiments, the drive member can have a removable power source 146 that can be, but is not required to be, a rechargeable battery pack such as a lithium-ion rechargeable battery pack. In some embodiments, the drive member 14 can be powered by alternating current electricity, a small combustion engine, or any other suitable power source.

Having described the details of the embodiments of the tow apparatus 10, the operation of the tow apparatus 10 will now be described in greater detail. In some embodiments, the order of the following steps is not strictly required. Rather, the tow apparatus 10 can be engaged with an aircraft nosewheel assembly and operated following any number of sequences of the following steps, in addition to other steps not explicitly recited herein. Additionally, in some embodiments, not all of the following steps are required to engage the tow apparatus 10 with an aircraft nosewheel assembly or to operate the tow apparatus 10.

Figure 13:
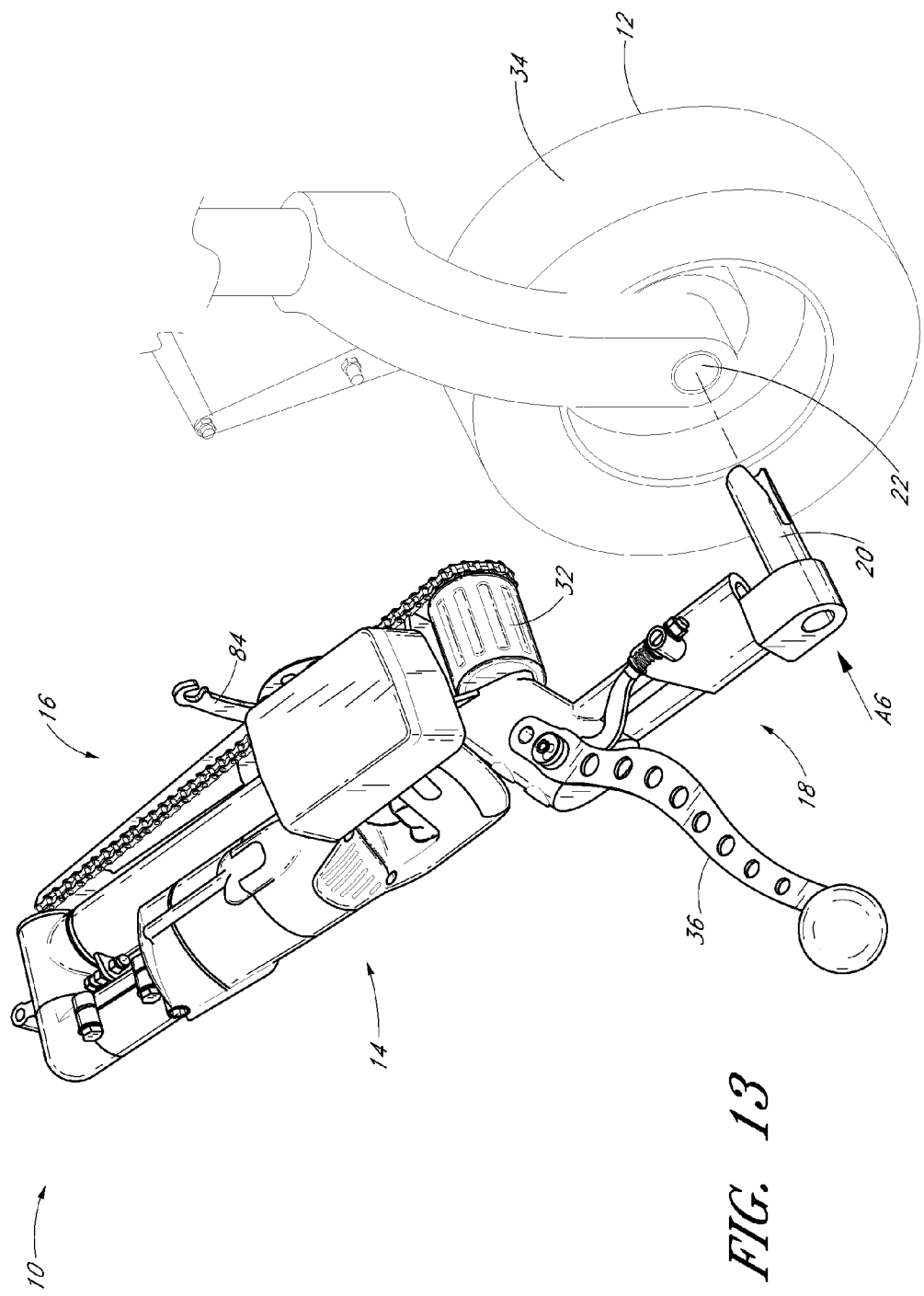
FIG. 13 is a perspective view of the tow apparatus, showing the tow apparatus in a folded or compact configuration before the tow apparatus has been engaged with a nosewheel assembly of an aircraft.

FIG. 13 is a perspective view of the tow apparatus 10, showing the tow apparatus 10 in a folded or compact configuration before the tow apparatus 10 has been engaged with a nosewheel assembly 12 of an aircraft. As illustrated in FIG. 13, with the lever arm 36 in the front position, the tow apparatus 10 can be engaged with the nosewheel assembly 12 by inserting the shaft 20 of the tow apparatus 10 in the direction represented by arrow A6 into the opening 22 in the nosewheel assembly 12 until the approximate center of the contact wheel 32 is approximately aligned with the approximate center of the wheel 34 of the nosewheel assembly 12 or until the shaft 20 is sufficiently engaged with the nosewheel assembly 12. As illustrated in FIG. 13, the tow apparatus 10 can be in a compact or folded configuration when the tow apparatus 10 is engaged with the nose wheel assembly 12. Alternatively, the tow apparatus 10 can be in an unfolded configuration when the tow apparatus 10 is engaged with the nose wheel assembly 12.

Figure 14:
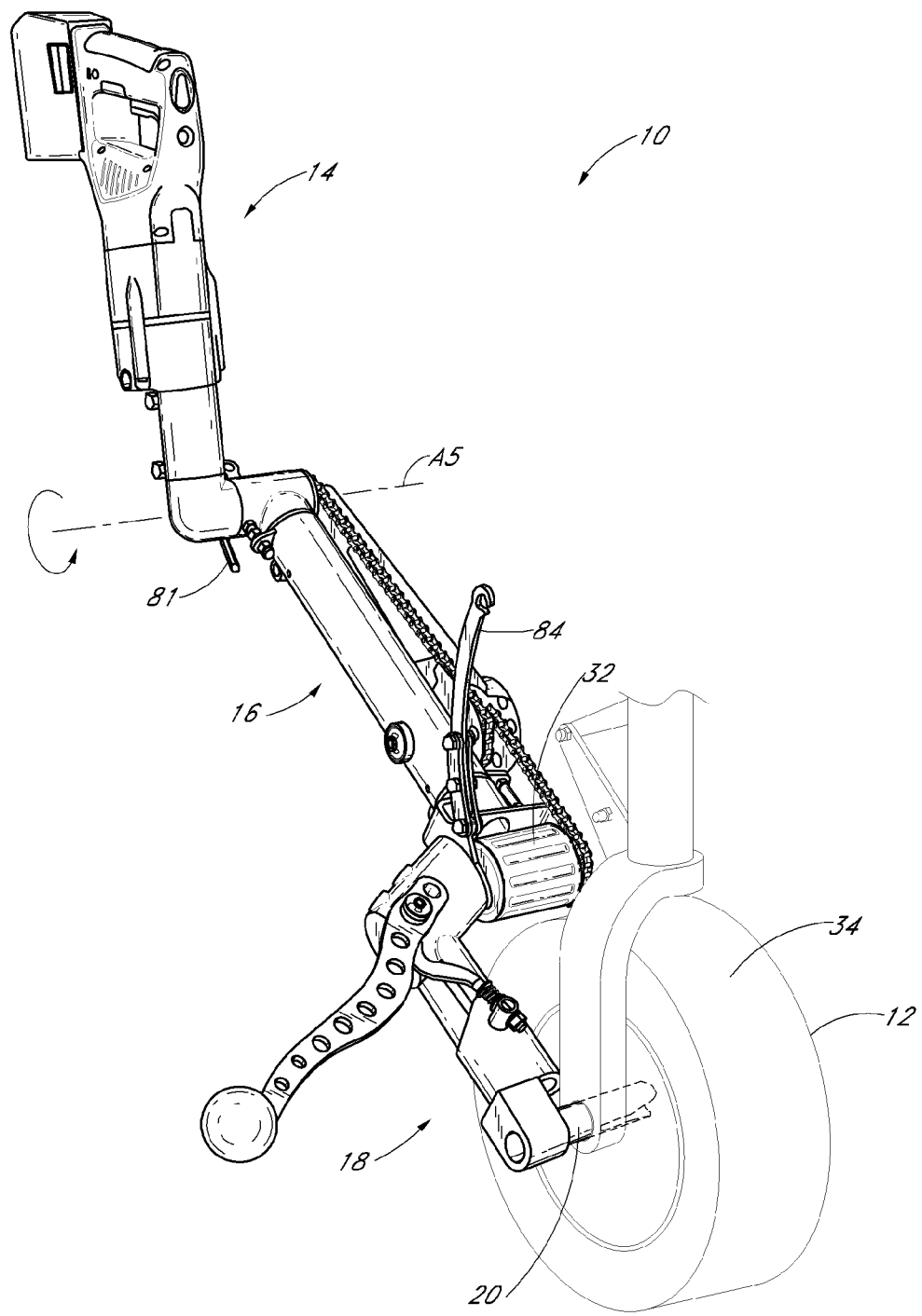
FIG. 14 is a perspective view of the tow apparatus, showing the tow apparatus in an unfolded configuration after the tow apparatus has been engaged with a nosewheel assembly of an aircraft, but before the drive wheel has been engaged with a nosewheel tire.

FIG. 14 is a perspective view of the tow apparatus 10, showing the tow apparatus 10 in an unfolded configuration after the tow apparatus 10 has been engaged with a nosewheel assembly 12 of an aircraft, but before the contact wheel 32 has been engaged with a nosewheel tire 34. As described above, with the clamping mechanism 80 is the loosened configuration, the drive member 14 can be changed from the folded or compact configuration shown in FIG. 13 to the unfolded or operational configuration shown in FIG. 14 by rotating the drive member 14 about axis A5 relative to the transmission portion 16 to a desired orientation. The user can then secure the drive member 14 in the desired orientation by tightening the bolt having the handle 81 of the clamping mechanism 80 so as to secure the drive member 14 to the transmission portion 16 in the desired rotational orientation. In some embodiments, the clamping mechanism 80 should be loosened before the user attempts to rotate the drive member 14 relative to the transmission portion 60.

Figure 15:
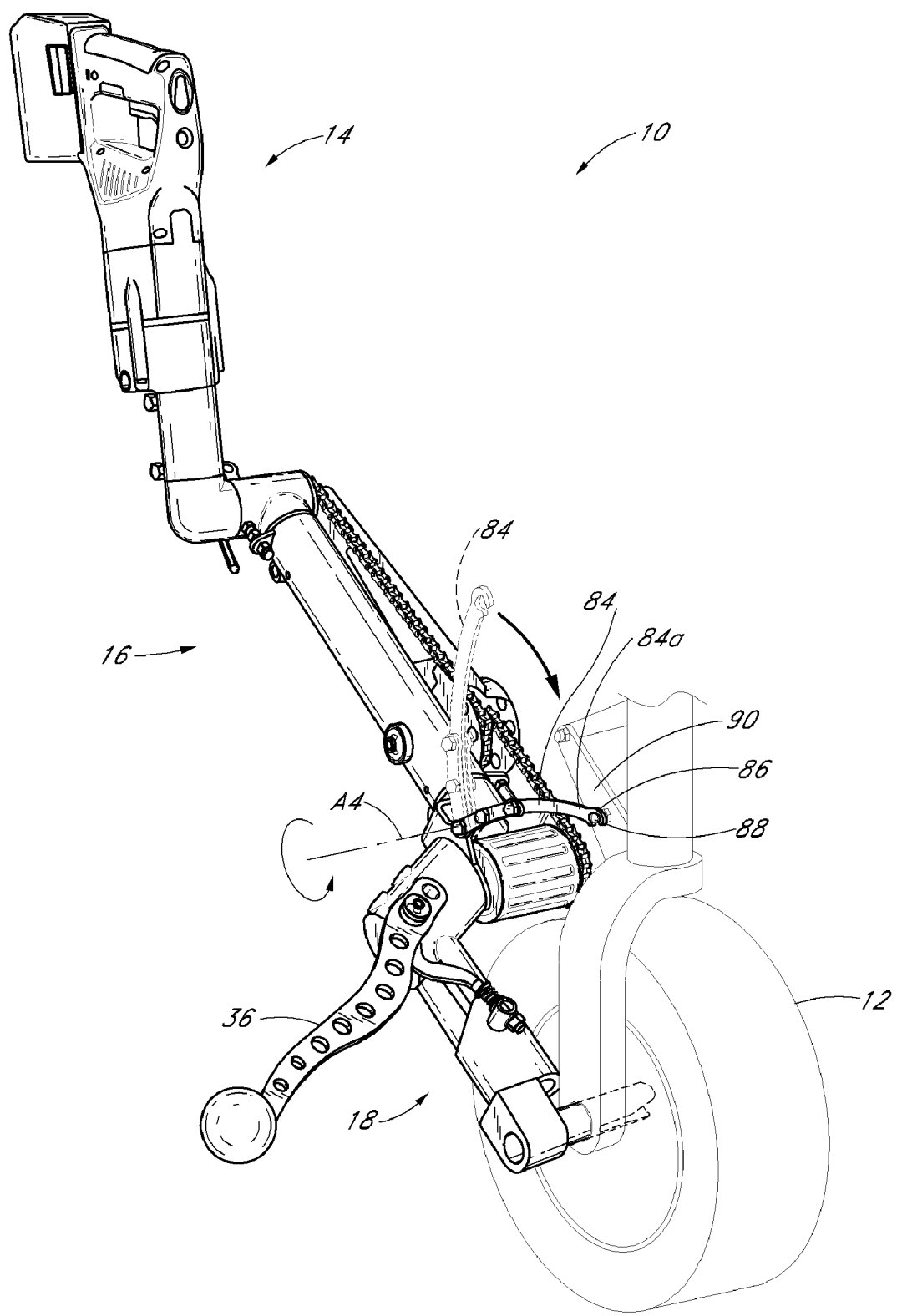
FIG. 15 is a perspective view of the tow apparatus, showing the torque arm of the tow apparatus being engaged with a nosewheel assembly.

FIG. 15 is a perspective view of the tow apparatus 10, showing the torque arm 84 of the tow apparatus 10 being engaged with a nosewheel assembly 12. In particular, the torque arm 84 can be moved from a first position (shown in dashed lines) to a second position (shown in solid lines) by rotating the torque arm 84 in around an axis A4. In the second position, the opening or slot 86 formed in a portion of the free end 84a of the torque arm 84 can be engaged with a shaft, bolt, or other suitable feature 88 protruding from or supported by a member 90 of the nosewheel assembly 12. As discussed above, when the torque arm 84 is engaged with the bolt or shaft 88 supported by the member 90 on the nosewheel assembly 12, the torque arm 84 can substantially reduce or prevent the tow assembly 10 from rotating relative to the nosewheel assembly 12 during operation.

Figure 16:
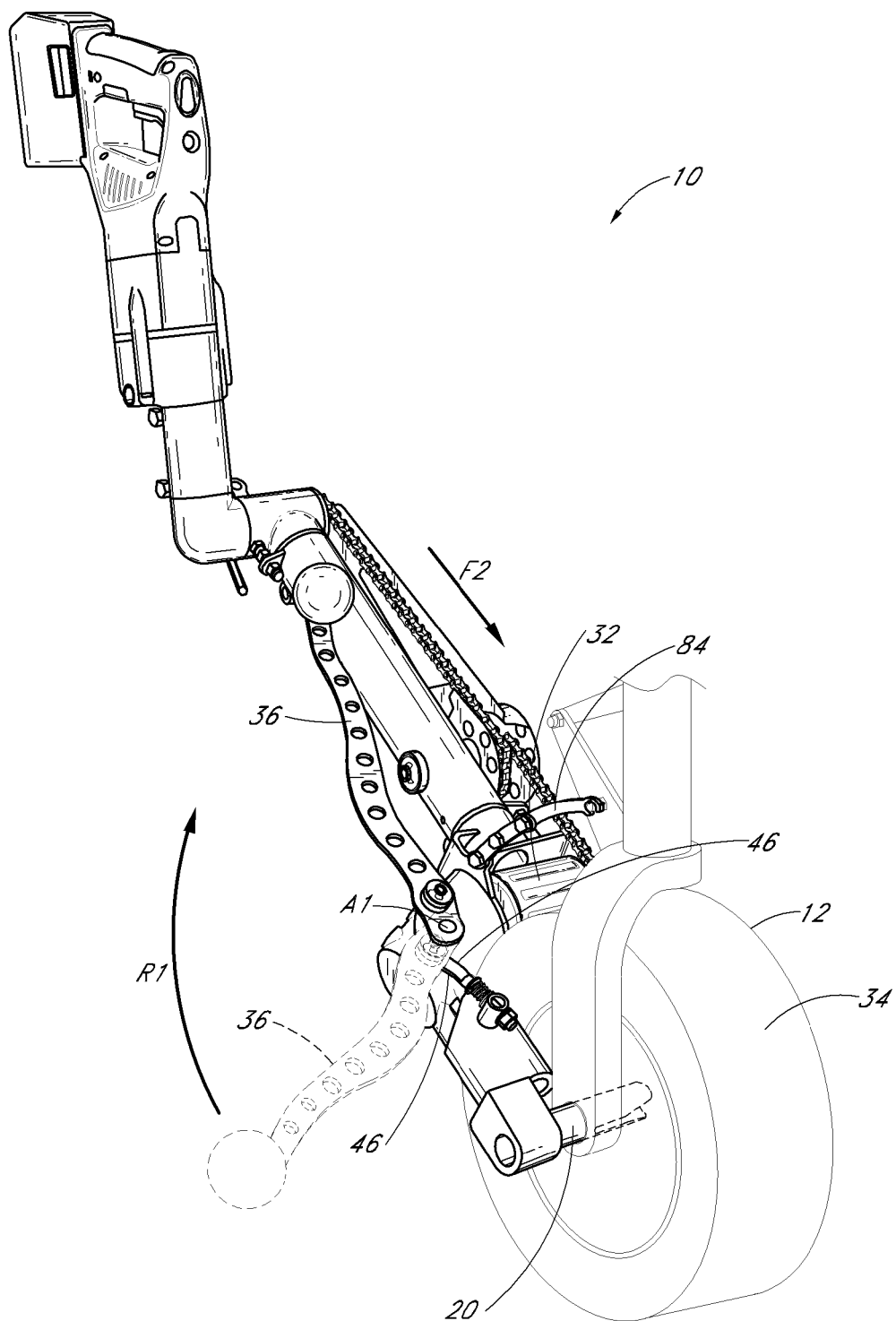
FIG. 16 is a perspective view of the tow apparatus, showing the drive wheel of the tow apparatus being engaged with a nosewheel tire of an aircraft.

FIG. 16 is a perspective view of the tow apparatus 10, showing the contact wheel 32 of the tow apparatus 10 being engaged with a nosewheel tire 34 of an aircraft. In particular, the contact wheel 32 can be engaged with the nosewheel tire 34 so that the contact wheel 32 can exert at least a light pressure on the nosewheel 34 by rotating the lever arm 36 in the direction R1 about the axis A1 (illustrated most clearly in FIG. 5) from a first position (shown in dashed lines) to a second position (shown in solid lines). As mentioned, in the second position, the contact wheel 32 can exert at least a light pressure or force (represented by F2 in FIG. 16) on the nosewheel tire 34 of the aircraft to increase the traction of the contact wheel 32 on the nosewheel tire 34 as the tow apparatus 10 is being operated.

The tow apparatus 10 can be configured such that, when the lever arm 36 is in a second position so that the contact wheel 32 can be engaged with the nosewheel tire 34, the lever arm 36 can be biased to remain in the second position until the user rotates the lever arm 36 back toward the first position. In particular, in some embodiments, the tow apparatus 10 can be configured such that, when the lever arm 36 is in the second position, the vector of the force exerted on the lever arm 36 by the connecting arm 46 can approximately intersect with the axis of rotation A1 of the lever arm 36, such that no or only an insignificant force is exerted on the lever arm 36 by the connecting arm 46. Further, in some embodiments, the tow apparatus 10 can be configured such that, when the lever arm 36 is in the second position, the vector of the force exerted on the lever arm 36 by the connecting arm 46 (in response to the radial force exerted on the contact wheel 32 from the nosewheel tire 34) can be offset from the axis of rotation A1 of the lever arm 36 so that the force exerted on the lever arm 36 by the connecting arm 46 can cause a torque to be exerted on the lever arm in the direction represented by R1 so as to bias the lever arm 36 in the second position.

As mentioned, when the drive member 14 is activated, the contact wheel 32 can exert a tangential force on the nosewheel tire 34 so as to rotate the nosewheel tire 34 when the contact wheel 32 is rotated by activating the drive member 14, thereby causing the aircraft to be moved. As discussed above, in some embodiments, the drive member 14 can be activated by depressing the trigger 142 of the drive member. Further, the direction of rotation of the contact wheel 32 and, hence, the nosewheel tire 34 can be reversed by switching the direction of rotation of the drive member 14. This can be achieved in some embodiments by changing the position of the switch 144 of the drive member 14, thereby easily permitting a user to change the direction of movement of the aircraft.

Additionally, a nosewheel assembly 12 of an aircraft is typically rotatable so as to permit a pilot to steer the aircraft while the aircraft is rolling on the ground. In some embodiments, because the tow apparatus 10 can be securely supported by the nosewheel assembly 12 of the aircraft, the tow assembly 10 can be used to steer the aircraft while the aircraft is being moved by the tow assembly 10 so as to permit a user to steer and maneuver the aircraft by manipulating the tow assembly 10 so as to cause the nosewheel assembly 12 to rotate.

Thus, the tow assembly 10 can be operated as described herein to move and maneuver an aircraft from one position or location to another. Thereafter, when the aircraft is in a desired position, the tow assembly 10 can be disengaged from the nosewheel assembly 12 by rotating the lever arm 36 about the axis A1 (illustrated most clearly in FIG. 5) from the second position (shown in solid lines in FIG. 16) to the first position (shown in dashed lines in FIG. 16), removing the torque arm 84 from the nosewheel assembly 12, and withdrawing the shaft 20 from the nosewheel assembly 12. The tow apparatus 10 can thereafter be folded or rotated into the compact configuration shown in FIG. 13 and stowed in a desired location either within the aircraft or otherwise.

As mentioned, in some embodiments, the tow apparatus 10 can be lightweight and compact so that the tow apparatus 10 can be folded up and stowed under a seat in an aircraft, or in any suitable compartment within an aircraft. In some embodiments, the tow apparatus 10 can weigh less than 22 pounds. In some embodiments, the tow apparatus 10 weighs less than approximately 20 pounds. The components of the tow apparatus 10 can be formed from any suitable materials, including aluminum, chromoly, steel, plastics, or any other suitable materials. Additionally, although not illustrated, the components comprising any embodiments of the tow apparatus 10 can be reversed, modified, or otherwise configured to accommodate different nosewheel assemblies of a wide ranging variety of aircraft.

While the above detailed description has shown, described, and pointed out novel features as applied to various embodiments, it will be understood that various omissions, substitutions, and changes in the form and details of the device or process illustrated can be made without departing from the spirit of the disclosure. Additionally, the various features and processes described above can be used independently of one another, or can be combined in various ways. All possible combinations and subcombinations are intended to fall within the scope of this disclosure.

As will be recognized, certain embodiments described herein can be embodied within a form that does not provide all of the features and benefits set forth herein, as some features can be used or practiced separately from others. The scope of the inventions is indicated by the appended claims rather than by the foregoing description. All changes which come within the meaning and range of equivalency of the claims are to be embraced within their scope.

What is claimed is:

1. A portable tow apparatus for moving an aircraft, comprising:
   a frame;
   a drive member supported by the frame, the drive member having a portable power source;
   a contact wheel supported by the frame and configured to be engageable with a nosewheel tire of an aircraft;
   a transmission portion comprising one or more drive wheels supported by the frame, the drive wheels being rotatable relative to the frame, the transmission portion being configured such that the drive wheels transfer and increase a rotational force produced by the drive member to the contact wheel;
   a shaft supported by the frame and configured to be insertable into an opening in a nosewheel assembly of an aircraft, the shaft being movable between a first position and a second position relative to the contact wheel, the shaft being closer to the contact wheel in the second position than in the first position; and
   a torque arm supported by the frame and configured to be engageable with the nosewheel assembly of the aircraft, the torque arm being configured to substantially prevent the rotation of the tow apparatus relative to the nosewheel assembly of the aircraft when the torque arm is engaged with the nosewheel assembly of the aircraft;
   wherein a centerline axis of the shaft is closer to a centerline axis of the contact wheel when the shaft is in the second position than in the first position.

2. The tow apparatus of claim 1, wherein the drive wheels are gears.

3. The tow apparatus of claim 1, wherein the drive wheels are pulleys.

4. The tow apparatus of claim 1, wherein the transmission portion comprises two or more gears supported by the frame.

5. The tow apparatus of claim 4, wherein the transmission portion further comprises a chain that is supported by two or more of the gears.

6. The tow apparatus of claim 1, wherein the transmission portion comprises four gears supported by the frame.

7. The tow apparatus of claim 6, wherein the transmission portion further comprises a first chain supported by a first gear and a second gear, and a second chain supported by a third gear and a fourth gear.

8. The tow apparatus of claim 7, wherein the second gear is rotationally linked to the third gear.

9. The tow apparatus of claim 1, wherein the tow apparatus is configured so that the drive member can securably rotate between a compact position and an extended position relative to the frame, wherein the overall length of tow apparatus is significantly reduced in the compact position as compared to the extended position.

10. The tow apparatus of claim 1, wherein the transmission portion can increase the torque generated by the drive member by a ratio of 4:1.

11. The tow apparatus of claim 1, wherein the transmission portion can increase the torque generated by the drive member by between approximately 2:1 and approximately 8:1.

12. The tow apparatus of claim 1, wherein the tow apparatus is configured so that the shaft is securable in the second position after the tow apparatus has been engaged with the nosewheel assembly of an aircraft.

13. The tow apparatus of claim 1, wherein the shaft is moved between the first position and the second position relative to the contact wheel by rotating a lever arm linked to the shaft.

14. The tow apparatus of claim 1, wherein the shaft is configured to be insertable into an opening in a nosewheel assembly so that the centerline of the shaft is approximately collinear with the axis of rotation of the nosewheel of the aircraft.

15. The tow apparatus of claim 1, wherein the drive member is battery powered.

16. The tow apparatus of claim 1, wherein the drive member is a right angled, battery powered drill.

17. The tow apparatus of claim 1, wherein the torque arm is rotatably supported by the frame.

18. The tow apparatus of claim 1, wherein the shaft is configured to attach to the nosewheel assembly at a first location and the torque arm is configured to attach to the nosewheel assembly at a second location that is different than the first location.

* * * * *